United States Patent [19]

Mahler

[11] Patent Number: 5,053,155

[45] Date of Patent: Oct. 1, 1991

[54] COMPOSITIONS AND PROCESS FOR USE IN REFRIGERATION

[75] Inventor: Walter Mahler, Wilmington, Del.

[73] Assignee: E. I. Du Pont de Nemours and Company, Wilmington, Del.

[21] Appl. No.: 452,406

[22] Filed: Dec. 19, 1989

[51] Int. Cl.$^5$ ................................................. C09K 5/04
[52] U.S. Cl. .................................. 252/68; 252/52 A; 252/58; 252/67
[58] Field of Search ..................................... 252/58, 68

[56] References Cited

U.S. PATENT DOCUMENTS

| | | | |
|---|---|---|---|
| 4,248,726 | 2/1981 | Uchinuma | 252/52 A |
| 4,267,064 | 5/1981 | Sasaki et al. | 252/68 |
| 4,454,052 | 6/1984 | Shoji et al. | 252/68 |
| 4,755,316 | 7/1988 | Magid et al. | 252/68 |
| 4,851,144 | 7/1989 | McGraw | 252/52 A |

FOREIGN PATENT DOCUMENTS 0021632  2/1984  Japan ................................. 252/68

*Primary Examiner*—Prince E. Willis
*Assistant Examiner*—Ellen McAvoy

[57] ABSTRACT

A blend of from 10% to 100% 1,1,2,2-tetrafluoroethane with at least one of 1,1,1,2-tetrafluoroethane and pentafluoroethane as refrigerant mixed with a mono- or difunctional polyalkylene glycol based on at least 80% propylene oxide having an SUS viscosity at 100° F. of 100 to 1200 is disclosed for use in compression refrigeration.

11 Claims, No Drawings

COMPOSITIONS AND PROCESS FOR USE IN REFRIGERATION

FIELD OF THE INVENTION

This invention relates to lubricants used with refrigerants in compression refrigeration and air-conditioning systems. More particularly, it relates to lubricants for use with saturated hydrocarbons having 1-4 carbon atoms that are partially or fully substituted with at least one atom of chlorine or fluorine, and have a normal boiling point of $-80°$ C. to $+50°$ C. Specifically, this invention relates to lubricants for use with tetrafluoroethanes, e.g. 1,1,1,2-Tetrafluoroethane (HFC-134a), and 1,1,2,2-Tetrafluoroethane (HFC-134). These compounds are being considered as replacements for dichlorodifluoromethane (CFC-12), particularly in automotive air conditioning systems.

BACKGROUND OF INVENTION

Refrigeration systems that use CFC-12 as the refrigerant generally use mineral oils to lubricate the compressor. (See for example the discussion in Chapter 32 of the 1980 ASHRAE Systems Handbook.) CFC-12 is completely miscible with such oils throught the entire range of refrigeration system temperatures, i.e. $-45°$ C. to 65° C. In automotive air-conditioning, paraffinic and naphthenic oils of about 500 SUS viscosity at 100° F. are usually used with CFC-12. These oils have "pour points" below $-20°$ C. and viscosities of about 55 SUS at 210° F. and are completely miscible with the CFC-12 refrigerant over the range of temperatures from $-10°$ C. to 100° C. Consequently, oil which dissolves in the refrigerant travels through the refrigeration loop in the air conditioning system and returns with the refrigerant to the compressor. It does not separate during condensation, although it may accumulate when the refrigerant is evaporated. At the same time, this oil which lubricates the compressor will contain some refrigerant which, in turn, may affect its lubricating properties.

When substituting HFC-134a or HFC-134 for CFC-12 in these refrigeration systems, it would be desirable to be able to use the same oils as used with CFC-12. It would not require any substantial change in equipment nor any significant changes in conditions used for the system. If lubricant separates from refrigerant during operation of the system, serious problems may result, i.e. the compressor could be inadequately lubricated. This would be most serious in automotive air-conditioning systems because the compressors are not separately lubricated and a mixture of refrigerant and lubricant circulate throughout the entire system. Unfortunately, however, the mineral oils are substantially immiscible with the tetrafluoroethanes.

Two recent publications of ASHRAE discuss the problems associated with separation of lubricants and refrigerants. These are "Fundamentals of Lubrication in Refrigerating Systems and Heat Pumps" Kruse and Schroeder ASHRAE Transactions Vol. 90, Part 2B, pps. 763-782, 1984 and "Evaluation of Lubricants for Refrigeration and Air-Conditioning Compressors", Spauschus, ibid pps. 784-798.

In summary, refrigerants which are not completely miscible with an oil in the full range of mixture compositions and operating temperatures may become miscible or immiscible as the temperature is raised or lowered from room temperature. The areas of immiscibility may assume a variety of shapes, i.e. parabolic or non-parabolic. As a parabola, the curve of miscibility temperature vs. percent oil in the mixture, may have its open or concave portion facing the low or high temperatures. The closed or convexportion of the parabolic curve identifies, respectively, the maximum or minimum temperature above or below which the refrigerant and the lubricating oil are completely miscible. These temperatures are referred to as the maximum or minimum "consolute temperatures." Beside parabolas, these curves can assume skewed parabolic shapes or curves of varying slope wherein immiscibility occurs above or below the curve.

One of the objects of this invention is to provide a combination of lubricating oil and tetrafluoroethane, e.g. HFC-134a and HFC-134, where the area of miscibility encompasses the full range of temperature and composition encountered in compression refrigeration, i.e. complete miscibility occurs for all compositions in the range of $-10°$ C. to at least 20° C., preferably from $-45°$ C. to at least 50° C. Another object is to provide a process for using such compositions in compression refrigeration.

PRIOR ART

U.S. Pat. No. 4,248,726. issued Feb. 5, 1981, and U.S. Pat. No. 4,278,064, issued May 12, 1981, both to Nippon Oil Company et al, relate to the use of a polyglycol oil such as polyoxypropylene glycol (or an alkyl ether thereof) having a viscosity index of at least 150 and a glycidyl ether type epoxy compound as a high viscosity refrigeration oil composition for halogen-containing refrigerants. These polyglycol/glycidyl ether compositions are disclosed for use with Freon ® 11, 12, 13, 22, 113, 114, 500 and 502; and as being "particularly effective" with Freon ® 12 or 22.

Research Disclosure 17463 entitled "Refrigeration Oil" by E. I. du Pont de Nemours and Company discloses polyalkylene glycols such as Ucon ® LB-165 and Ucon ® LB-525 sold by Union Carbide Corporation, for use with HFC-134a. These glycols are polyoxypropylene glycols that are mono-functional and are prepared from propylene oxide initiated with n-butanol. The publication states that these combinations of oil and refrigerant are miscible in all proportions at temperature at least as low as $-50°$ C. and are thermally stable in the presence of steel, copper and aluminum at 175° C. for about six days. However, as stated in U.S. Pat. No. 4,755,316, Col. 5, line 14 ff. the "Ucon ® LB-525 has been found to be immiscible at above about $+5°$ C. with HFC-134a... Practically this means that such lubricants are not miscible with HFC-134a over most of the temperature range used in automotive air conditioning. For such use the miscible range should be from $-40°$ C. to at least $+50°$ C. or higher, above 90° C., if possible".

U.S. Pat. No. 4,755,316, isued July 5, 1988, to Allied-Signal Inc. also relates to the use of polyalkylene glycols of the polyoxypropylene glycol type. However, these glycols are at least difunctional with respect to hydroxyl groups and contain at least 80% propylene units relative to the total, the remaining 20% may derive from ethylene or butylene oxide or esters, olefins and the like which are polymerizable with propylene oxide. It should be noted that only 100% oxypropylene units in the difunctional PAGs are exemplified in this patent and similarly, only 100% oxypropylene units in the monofunctional PAGs were disclosed in the Research Disclosure 17463; and, further, that all the examples in this Allied-Signal patent involve HFC-134a. No examples involving HFC-134 are disclosed. It should also be noted from Table A in column 6 of this patent that several of the difunctional polyoxypropylene glycols claimed to be useful in this patent are not miscible with HFC-134a to at least 50° C., e.g. NIAX-1025 at 50 wt. % HFC-134a "to over 40° C.", PPG-2000 at 85 wt % HFC-134a "to 13° C."; and PPG-2000 at 50 wt. % HFC-134a "to 43° C.";

SUMMARY OF THE INVENTION

The present invention is based on the discovery that the use of at least about 10% by volume of HFC-134, preferably at least 20%, most preferably at least 50%, in a blend with HFC-134a or HFC-125 will expand the miscibility range of the latter tetrafluoroethane, HFC-134a, or pentafluoroethane, HFC-125, with both the monofunctional and the difunctional polyalkylene glycols of the polyoxypropylene type. Polyalkylene glycols of the polyoxypropylene type are defined as glycols that are either monofunctional or at least difunctional with respect to hydroxyl groups and contain greater than 75% propylene oxide units, the remaining may derive from ethylene oxide or butylene oxide or hydroxylated esters, hydroxylated olefins and the like which are polymerizable with propylene oxide.

Thus, I have found that the use of a sufficient amount to lubricate, usually 10-20% by volume for automotive use, and in some situations as high as 50% by volume of at least one mono- or di-functional polyalkylene glycol (PAG), also referred to as polyoxyalkylene glycol, based on a significant amount of propylene oxide in a random copolymer, preferably at least 80% propylene oxide, and most preferred 100% propylene oxide, will be completely miscible with a blend of the tetrafluoroethanes, usually 80-90% by volume of the tetrafluoroethanes, the blend containing at least about 10% by volume of HFC-134 with HFC-134a. This blend may also be blended with other refrigerants in the range of temperatures from −40° C. to at least 50° C. It should also be understood that 100% HFC-134 is miscible with the aforementioned glycols of the polyoxypropylene type.

Basically, the use of 10% by volume of HFC-134 in a blend with 90% by volume of HFC-134a will expand the miscibility range of HFC-134a with the polyoxyalkylene glycol (based on at least 50% propylene oxide) by 20° C., i.e. +10° C. at the upper end of the range and −10° C. at the lower end. Surprisingly, in the compression cycles with LB525 (a mono functional polyoxypropylene glycol having an SUS viscosity of 525 and prepared using butanol as initiator), the use of 20% by volume of HFC-134 with the remainder being HFC-134a expands the miscibility range from −28° C. to only −8° C. for HFC-134a alone to from −68° C. to 36° C.; and the use of 50% by volume of HFC-134 with HFC-134a will expand the miscibility range to from −90° C. to 72° C.! Thus, although 10% by volume of HFC-134 with HFC-134a provides significant improvement, at least 20% is preferred and at least 50% HFC-134 is most preferred.

The weight ratio of refrigerant (HFC-134 or blended with HFC-134a) to the PAG lubricant in the mixtures used for refrigeration may be anywhere from 99/1 to 1/99, preferably 99/1 to 70/30. The viscosities of the polyalkylene glycols may be anywhere from 50 to 3000 SUS at 100° F. but for most commercial uses, from 100 to 1200 SUS at about 100° F.

The process of manufacturing the mono-functional PAGs may involve initiation with methanol, ethanol, propanol or butanol. The last mentioned, butanol, is the preferred initiator; and the process of manufacture is described in the Encyclopedia of Polymer Science and Engineering, Volume 6, pps. 225-273; "Ethylene Oxide Polymers and Copolymers" by Clinton and Matlock, 2nd edition, 1986, John Wiley & Sons.

The process of manufacturing the di-functional PAGs may involve initiation with a glycol having anywhere from two to six carbon atoms between —OH groups. Diethylene glycol is the preferred initator; and the process of manufacture is described in the Encyclopedia of Polymer Science and Engineering, Volume 6; "Ethylene Oxide Polymers and Copolymers" by Clinton and Matlock, 2nd edition, 1986, John Wiley & Sons.

It has been known that the use of an appropriate amount of an "extreme pressure additive" improves the lubricity and load-bearing characteristics of the butanol-initiated monofunctional random polyalkylene glycol having 50% oxyethylene units as set forth in the U.S. application Ser. No. 360,981 filed June 2, 1989; and it is expected that the EP additives will also improve the quality of the refrigerant-lubricant compositions of this invention. EP additives for use in this invention are included among those disclosed in Table D of U.S. Pat. No. 4,755,316. The preferred ones are the organic phosphates and include Lubrizol® 1097, a zinc (dialkyl dithio) phosphate manufactured by the Lubrizol Corporation; and SYN-O-AD® 8478, a 70%/30% blend of tri (2,4, 6-tri-t-butyl phenyl) phosphate/triphenyl phosphate manufactured by the Akzo company.

EP additives may also be used in conjunction with some of the anti-wear additives, oxidation and thermal stability improvers, corrosion inhibitors, viscosity index improvers, detergents and anti-foaming agents disclosed in Table D of U.S. Pat. No. 4,755,316. These additives may also be partially or fully fluorinated. A preferred blend of additives is MLX-788, a proprietary mixture of Union Carbide Corporation containing a phosphate and two amine-containing compounds.

DESCRIPTION OF PREFERRED EMBODIMENTS

As stated previously, HFC-134 and the blends of tetrafluoroethanes HFC-134a and HFC-134 or HFC-125 and HFC-134 have physical characteristics which allow substitution for CFC-12 with only a minimum of equipment changes in compression refrigeration. These blends could be further blended with other refrigerants, including HFC-125($CHF_2CF_3$) with HFC-134a or HFC-134a with HFC-125, as well as CFC-12($CCl_2F_2$), HCFC-22($CHClF_2$), HFC-152a($CH_3CHF_2$), HCFC-124($CHCLFCF_3$), HCFC-124a($CHF_2CClF_2$), HCFC-142b($CH_3CClF_2$), HFC-32($CH_2F_2$), HFC-143a($CH_3CF_3$), HFC-143($CHF_2CH_2F$), and FC-218($CF_3CF_2CF_3$); and for purposes of the present invention these latter blends are not excluded. However, only those blends of the tetrafluoroethanes with other refrigerants which are miscible with the lubricants of this invention in the range of −45° C. to about +20° C. are included.

HFC-134a may be prepared by any of the methods disclosed in the prior art; e.g., U.S. Pat. Nos. 2,745,886; 2,887,427; 4,129,603; 4,158,675; 4,311,863; 4,792,643 and British 1,578,933 and 2,030,981.

HFC-134 may be prepared by the method disclosed by Wilford, Forster and Stone in Journal Chemical Society, 1965, 6519-6523; or the method disclosed in British 1,578,933.

The most preferred mono-hydroxyl polyalkylene glycol for use in this invention is based on the random polymerization of propylene oxide initiated with butanol. Although the viscosity can range from about 100 to 1200 SUS viscosity at 100° F., preferably 400 to 1200 SUS, the most preferred PAG is the Ucon® LB 525, 525 representing the SUS viscosity at 100° F.; "L" representing "lipophylic"), that is manufactured by the Union Carbide Corporation. The process for its manufacture is described in the 1986 edition of the Encyclopedia of Polymer Science and Engineering.

The preferred LB525 oil has a pour point below −40° C., is completely miscible with the 10% blend of HFC-134 with HFC-134a from −50° C. to condenser temperatures above 50° C., and meets all the other requirements for automotive air conditioning, i.e. viscosity index, stability, lubricity, and miscibility with the blend of HFC-134 and HFC-134a down to below −20° C. Furthermore, the use of an extreme pressure oil additive such as those mentioned previously should improve the load-carrying capability significantly.

Specifically, the lubricants used in the compositions of this invention, and in the invented method for providing lubrication in compression refrigeration and air-conditioning equipment have the following characteristics:

Viscosity at 100° F.
50 to 3000 SUS, preferably 100 to 1200 SUS, particularly about 500 SUS for autmotive air-conditioning
Viscosity Index
Greater than 90, preferably 150 to 250 or higher
Pour Point
Less than −20° C., preferably −20° C. to about −50° C. and to about −33° C. for the 100 SUS and 1200 SUS oils, respectively
Solubility or miscibility range
100% soluble from 90° C. to (a) less than −40° C. for 1-99 weight percent of the blend of HFC-134 and HFC-134a in mixture with lubricants having viscosities at 100° F. of 50 SUS to 3000 SUS; or (b) less than −10° C. for the preferred 500 SUS lubricants.

1. Solubility of Refrigerant in Lubricants

Six ml. blends of refrigerant (HFC134/134a) and lubricant were used for some of the solubility studies. Generally, the mixtures contained 30, 60, and 90 wt. % refrigerant. These air-free mixtures were contained in sealed Pyrex® tubes (7/16" I.D.×5.5"), ca. 12.5 cc capacity) or, as in Example 1 for the LB525 oil (1/8" I.D.×5 7/8" length) where the liquid refrigerant and oil mixture occupied about 60 volume per cent of the tube at 25° C. Generally, a mixture containing about 83% by weight refrigerant and about 17% by weight oil was tested in these tubes. The refrigerant/ lubricant solubilities were determined by completely immersing the tube in a bath at each test temperature for a minimum of 15 minutes and providing agitation to facilitate mixing and equilibration. The accuracy of determining the temperatures when the refrigerant/lubricant blend became either miscible or immiscible was about +2° C. The refrigerant/lubricant blends were called immiscible when the blend formed floc; became cloudy; or formed two liquid layers. These solubility tests were run from about 93° C. to at least −50° C. Tests were not run above 93° C. for safety and practical reasons.

2. Viscosity and Viscosity Index a. Viscosity is a property that defines a fluid's resistance to shearing force. It is expressed in terms of absolute viscosity, kinematic viscosity or Saybolt Universal Seconds viscosity (SUS), depending on the method by which it is determined. Conversion from SUS to mm²/s (centistokes) can be readily made from tables contained in ASTM D-445, but it is necessary to know the density to convert kinematic viscosity to absolute viscosity. Refrigeration oils are sold in viscosity grades, and AST proposed a system of standardized viscosity grades from industry-wide usage (D-2422).

b. Viscosity Index is a measure of the amount of change experienced by an oil with changes in temperature.

Viscosity decreases as the temperature increases; and increases as the temperature decreases. The relationship between temperature and kinematic viscosity is represented by:

$$\log \log (v+0.7) = A + B \log T \quad \text{(Equation 1)}$$

where
  v = kinematic viscosity, mm²/s (CST)
  T = thermodynamic temperature (Kelvin)
  A,B = constants for each oil This relationship is the basis for the viscosity temperature charts published by ASTM and permits a straight line plot of viscosity over a wide temperature range. This plot is applicable over the temperature range in which the oils are homogeneous liquids.

The slope of the viscosity-temperatures lines is different for different oils. The viscosity-temperature relationship of an oil is described by an empirical number called "the viscosity index" (VI) as referred to in ASTM D-2270. An oil with a high viscosity index (HVI) shows less change in viscosity over a given temperature range than an oil with a low viscosity index (LVI).

3. Pour Point

Any oil intended for low temperature service should be able to flow at the lowest temperature likely to be encountered. The procedure for determining pour point is desribed in ASTM D-97.

The invention will be more clearly understood by referring to the following experiments which are presented in Tables I-IV.

Table I summarizes the solubility data for various blends of HFC-134 and HFC-134a (including 100% HFC-134) as refrigerant with 17 weight per cent LB525, a mono-functional polyoxypropylene glycol, as the lubricant. It will be noted that 100% HFC-134a and 95% HFC-134a do not provide acceptable solubility ranges when used with LB525.

Table II summarizes the solubility data for HFC-134 and HFC-134a for various mixtures with the monofunctional glycols LB525 and LB165, using a test range of 93° to −50° C. It will be noted that HFC-134, particularly with LB 525, turns failure with HFC-134a into success.

Table III summarizes the solubility data for HFC-134 and HFC-134a for various mixtures with difunctional polyoxypropylene glycols using a test range of 93° to −50° C.

Table IV summarizes the solubility data for a blend of HFC-134 and HFC-134a (compared to 100% HFC-134a) as the refrigerant with 17 weight per cent LB 165, a monofunctional polyoxypropylene glycol, as the lubricant. It will be noted that as little as 20% HFC-134 in the blend with HFC-134a expands the solubility range to the maximum, 90° C. to −50° C. from 69° C. to −50° C. for the pure HFC-134a.

Table V summarizes the solubility data for blends of HFC-134 and HFC-134a (compared to 100% HFC-134a) as refrigerant with 17 weight percent NIAX-1025* as the lubricant. It will be noted that in Table A in column 6 of U.S. Pat. No. 4,755,316, this lubricant is miscible with 50 weight percent HFC-134a to only "over 40° C."; whereas when as little as 20% HFC-134 is blended with 80% HFC-134a, the upper limit of the range is expanded to 79° C.

Table VI summarizes the solubility data for blends of HFC-134 and HFC-134a (compared to 100% HFC-134a) as refrigerant with 17 weight percent PPG-1200 as the lubricant. Again, it is apparent that the upper limit of the solubility range where HFC-134a is the refrigerant is raised 15° C. with as little as 20% HFC-134 in the blend.

TABLE I

Solubility of Refrigerant
(Blends of HFC-134/HFC-134a) in mixtures
(83 weight % refrigerant/17 weight % oil) with
LB525** as the Oil

| Expt. No. | Vol. % HFC-134 in HFC 134/HFC 134a blend | Miscible Range (°C.) |
|---|---|---|
| 1 | 100 | 93 to −84 |
| 2 | 80 | 90 to −85 |
| 3 | 70 | 84 to −85 |
| 4 | 50 | 73 to −88 |
| 5 | 30 | 52 to −84 |
| 6 | 15 | 38 to −69 |
| 7 | 5 | 16 to −52 |
| 8 | 0 | −8 to −28 |

*A di-functional polyoxypropylene glycol manufactured by Union Carbide Corp.
**A mono-functional polyoxpropylene glycol manufactured by Union Carbide Corp.

TABLE II

Solubility of Refrigerant
in Various Mixtures with Monofunctional Glycols
over the Test Range of 93° to −50° C.

| Expmt. No. | Oil | 100° F. Viscosity (SUS) | Wt. % HFC in HFC/oil | Miscible Range (°C. to °C.) HFC-134 | HFC-134a |
|---|---|---|---|---|---|
| 9 | LB525*** | 525 | 30 | 93* to −50** | 40 to −50* |
| 10 | " | 525 | 60 | 93* to −50** | 35 to −40 |
| 11 | " | 525 | 90 | 93* to −50* | −7 to −23 |
| 12 | LB165*** | 165*** | 30 | 93* to −50* | 93 to −50* |
| 13 | " | 165 | 60 | 93* to −50* | 93 to −50* |
| 14 | " | 165 | 80 | 93* to −78* | 69 to −50* |
| 15 | " | 165 | 90 | 93* to −50* | 73 to −50* |
| 16 | LB135*** | 135 | 80 | 93* to −78* | 83 to −78* |

*Test discontinued.
**No phrase separation to −50° C. but Schlieren lines appear at 5° C. for Ex. 9, −35° C. for Ex. 10 and −10° C. for Ex. 12.
***A monofunctional polyoxypropylene glycol manufactured by Union Carbide Corp.

TABLE III

Solubility of Refrigerant in
Various Mixtures with Difunctional Glycols over the
Test Range of 93° to −50° C.

| Expt No. | Oil | 100° F. Viscosity (SUS) | Wt % HFC in HFC/Oil | Miscible Range (°C. to °C.) HFC 134 | HFC 134a |
|---|---|---|---|---|---|
| 17 | PPG 1200* | 480 | 30 | 93 to −10 | 93 to −5 |
| 18 | " | " | 60 | 93 to −50 | 53 to −40*** |
| 19 | " | " | 90 | 93 to −50 | 53 to −50 |
| 20 | Niax ® 1025** | 370 | 30 | 93 to −15 | 93 to −5 |
| 21 | Niax ® 1025** | " | 60 | 93 to −33 | 60 to −5 |
| 22 | Niax ® 1025** | " | 90 | 93 to −50 | 68 to −50 |
| 23 | Niax ® 425** | 154 | 30 | 93 to −10 | 93 to −40*** |
| 24 | Niax ® 425** | " | 60 | 93 to −50 | 45 to −38 |
| 25 | Niax ® 425** | " | 90 | 93 to −50 | 93 to −50 |

*A difunctional polyoxypropylene glycol manufactured by Dow Chemical Company.
**A difunctional polyoxypropylene glycol manufactured by Union Carbide Corp.
***No phase separation to −40° C. but Schlieren lines appear at −5° C.

TABLE IV

Solubility of Refrigerant
(Blends of HFC-134/HFC-134a)
in mixtures (83 wt. % refrigerant/
17 wt. % oil) with LB 165* as the oil

| Expt. No. | Vol. % HFC-134 in HFC-134/HFC-134a blend | Miscible Range (°C. to °C.) |
|---|---|---|
| 26 | 20 | 90 to −50 |
| 27 | 0 | 69 to −50 |

*A monofunctional polyoxypropylene glycol manufactured by Union Carbide Corp.

TABLE V

Solubility of Refrigerant
(Blends of HFC-134/HFC-134a)
in mixtures (83 wt. % refrigerant/
17 wt. % oil) with NIAX-1025* as the oil

| Expt. No. | Vol. % HFC-134 in HFC-134/HFC-134a blend | Miscible Range (°C. to °C.) |
|---|---|---|
| 28 | 50 | 98 to −50 |
| 29 | 20 | 79 to −50 |
| 30 | 0 | 64 to −50 |

*A difunctional polyoxypropylene glycol manufactured by Union Carbide Corp.

TABLE VI

Solubility of Refrigerant
(Blends of HFC-134/HFC-134a)
in mixtures (83 wt. % refrigerant/
17 wt. % oil) with PPG-1200* as the oil

| Expt. No. | Vol. % HFC-134 in HFC-134/HFC-134a blend | Miscible Range (°C. to °C.) |
|---|---|---|
| 31 | 50 | 90 to −50 |
| 32 | 20 | 71 to −50 |
| 33 | 0 | 56 to −50 |

*A difunctional polyoxypropylene glycol manufactured by Dow Chemical Company.

What is claimed is:

1. A composition for use in compression refrigeration comprising;

(a) a refrigerant containing at least 10% by volume of 1,1,2,2-tetrafluoroethane in a blend with at least 10% by volume of at least one of 1,1,1,2-tetrafluoroethane and pentafluoroethane; and (b) a lubricant comprising at least one mono-functional polyalkylene glycol with respect to hydroxly groups, containing greater than 75% propylene oxide units, having an SUS viscosity at 100° F. of 100 to 1200 and being miscible in combination with said refrigerant in the range of temperatures from −40° C. to at least =20° C.

2. The composition of claim 1 wherein said refrigerant comprises at least 20% by volume of 1,1,2,2-tetrafluoroethane in a blend with at least 20% by volume of 1,1,1,2-tetrafluoroethane.

3. The composition of claim 1 wherein said mono-functional polyalkylene glycol has an SUS viscosity at 100° F. of 525.

4. The composition of claim 1 wherein said mono-functional polyalkylene glycol is based on 100% propylene oxide units.

5. A method for improving lubrication in compression refrigeration equipment using a refrigerant containing at least 20% by volume of 1,1,2,2-tetrafluoroethane in a blend with at least 10% by volume of at lease one of 1,1,1,2-tetrafluoroethane and pentafluoroethane and using 1–99% by weight of a lubricant comprising at least one mono-functional polyalkylene glycol with respect to hydroxyl groups, containing greater than 75% propylene oxide units in combination with said refrigerant, said lubricant having an SUS viscosity of 100–1200 at 100° F.

6. A composition for use in compression refrigeration comprising:

(a) a refrigerant comprising at least 20% by volume of 1,1,2,2-tetrafluoroethane in a blend with at least 20% by volume of at least one of 1,1,1,2-tetrafluoroethane and pentafluoroethane; and (b) a lubricant comprising at least one polyalkylene glycol which is difunctional with respect to hydroxyl groups, containing greater than 75% propylene oxide units, having an SUS viscosity at 100° F. of 100 to 1200 and being miscible in combination with said refrigerant in the range of temperatures from −40° C. to at least =20° C.

7. The composition of claim 6 wherein said refrigerant comprises about 20% by volume of 1,1,2,2-tetrafluoroethane in a blend with about 80% by volume of 1,1,1,2-tetrafluoroethane.

8. The composition of claim 6 wherein said refrigerant comprises about 50% by volume of 1,1,2,2-tetrafluoroethane in a blend with about 50% by volume of 1,1,1,2-tetrafluoroethane.

9. The composition of claim 6 wherein the SUS viscosity at 100° F. of said difunctional polyalkylene glycol is from 400 to 1000.

10. A method for improving lubrication in compression refrigeration equipment using a refrigerant comprising at least 20% by volume of 1,1,2,2-tetrafluoroethane in a blend with at least 20% by volume of at least one of 1,1,1,2-tetrafluoroethane and pentafluoroethane and using 1–99% by weight of a lubricant comprising at least one polyalkylene glycol which is difunctional with respect to hydroxyl groups, containing greater than 75% propylene oxide units in combination with said refrigerant, said lubricant having an SUS viscosity of 100–1200 at 100° F.

11. The method of claim 10 wherein said lubricant is based on 100% propylene oxide units.

* * * * *